US011579253B2

(12) United States Patent
Byrnes et al.

(10) Patent No.: US 11,579,253 B2
(45) Date of Patent: Feb. 14, 2023

(54) DUAL-POLARIZATION LIDAR SYSTEMS AND METHODS

(71) Applicant: The Charles Stark Draper Laboratory, Inc., Cambridge, MA (US)

(72) Inventors: Steven J. Byrnes, Watertown, MA (US); Steven J. Spector, Lexington, MA (US); Michael G. Moebius, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 505 days.

(21) Appl. No.: 16/679,053

(22) Filed: Nov. 8, 2019

(65) Prior Publication Data

US 2020/0150241 A1     May 14, 2020

Related U.S. Application Data

(60) Provisional application No. 62/757,987, filed on Nov. 9, 2018.

(51) Int. Cl.
*G01S 7/481*       (2006.01)
*G01S 17/06*       (2006.01)
(Continued)

(52) U.S. Cl.
CPC ............ *G01S 7/4815* (2013.01); *G01S 17/06* (2013.01); *G02B 6/122* (2013.01);
(Continued)

(58) Field of Classification Search
CPC ............................. G01S 7/4812; G01S 7/4815
See application file for complete search history.

(56) References Cited

U.S. PATENT DOCUMENTS 10,353,054 B2 * 7/2019 Hinokuma ............ G01S 7/4812
10,466,423 B2   11/2019 Spector et al.
(Continued)

FOREIGN PATENT DOCUMENTS

WO    WO-2019136166 A1 * 7/2019

OTHER PUBLICATIONS

Khorasaninejad, et al, "Metalenses at visible wavelengths: Diffraction-limited focusing and subwavelength resolution imaging," Science, vol. 352, Issue 6290, pp. 1190-1194, Jun. 3, 2016.
(Continued)

*Primary Examiner* — Charlie Y Peng
(74) *Attorney, Agent, or Firm* — George Jakobsche Patent Counsel PLLC

(57) ABSTRACT

A LiDAR system has a field of view and includes a polarization-based waveguide splitter. The splitter includes a first splitter port, a second splitter port and a common splitter port. A laser is optically coupled to the first splitter port via a single-polarization waveguide. An objective lens optically couples each optical emitter of an array of optical emitters to a respective unique portion of the field of view. An optical switching network is coupled via respective dual-polarization waveguides between the common splitter port and the array of optical emitters. An optical receiver is optically coupled to the second splitter port via a dual-polarization waveguide and is configured to receive light reflected from the field of view. A controller, coupled to the optical switching network, is configured to cause the optical switching network to route light from the laser to a sequence of the optical emitters according to a temporal pattern.

24 Claims, 15 Drawing Sheets

(51) Int. Cl.
    *G02B 6/122* (2006.01)
    *G02B 27/00* (2006.01)
    *G02B 27/28* (2006.01)
    *G02B 6/12* (2006.01)

(52) U.S. Cl.
    CPC ....... *G02B 27/0075* (2013.01); *G02B 27/283* (2013.01); *G02B 2006/1215* (2013.01); *G02B 2006/12102* (2013.01); *G02B 2006/12107* (2013.01); *G02B 2006/12116* (2013.01); *G02B 2006/12121* (2013.01); *G02B 2006/12145* (2013.01)

(56) References Cited

U.S. PATENT DOCUMENTS

| | | | |
|---|---|---|---|
| 10,473,862 B2 | 11/2019 | Spector et al. | |
| 10,545,289 B1* | 1/2020 | Chriqui | G02B 27/0087 |
| 2007/0229799 A1 | 10/2007 | Baillon et al. | |
| 2011/0141471 A1 | 6/2011 | Schlotterbeck et al. | |
| 2017/0089829 A1* | 3/2017 | Bartholomew | G01N 21/255 |
| 2018/0175961 A1* | 6/2018 | Spector | B81B 3/0083 |
| 2019/0162908 A1 | 5/2019 | Moebius et al. | |
| 2019/0271821 A1 | 9/2019 | Moebius et al. | |
| 2021/0156997 A1* | 5/2021 | Weinert | G01S 7/4818 |

OTHER PUBLICATIONS

Zhang, et al., "Silicon-Waveguide-Based Mode Evolution Polarization Rotator," IEEE Journal of Selected Topics in Quantum Electronics, vol. 16, No. 1, pp. 53-60, Jan. 2010.

Aashna, et al., "Highly efficient broadband waveguide based adiabatic polarization converter with apodization," 2016 International Conference on Numerical Simulation of Optoelectronic Devices (NUSOD), 2 pgs., Jul. 2016.

Chiu, et al., "Polarization independent grating coupler for silicon-on-insulator waveguides," 2010 International Conference on Optical MEMS and Nanophotonics, 2 pgs., Aug. 2010.

Shen et al., "An integrated-nanophotonics polarization beamsplitter with 2.4×2.4 $\mu m^2$ footprint," Nature Photonics 9, 378, 5 pgs., May 18, 2015.

James, et al., "Fibre optic based reference beam laser Doppler velocimetry," Optics Communications, Elsevier, vol. 119, No. 5, pp. 460-464, Sep. 15, 1995.

European Patent Office as the International Searching Authority, Authorized Officer: Yvonne Rösner, International Search Report and Written Opinion of the International Searching Authority, PCT/US19/60633, dated Jun. 26, 2020, 17 pages.

\* cited by examiner

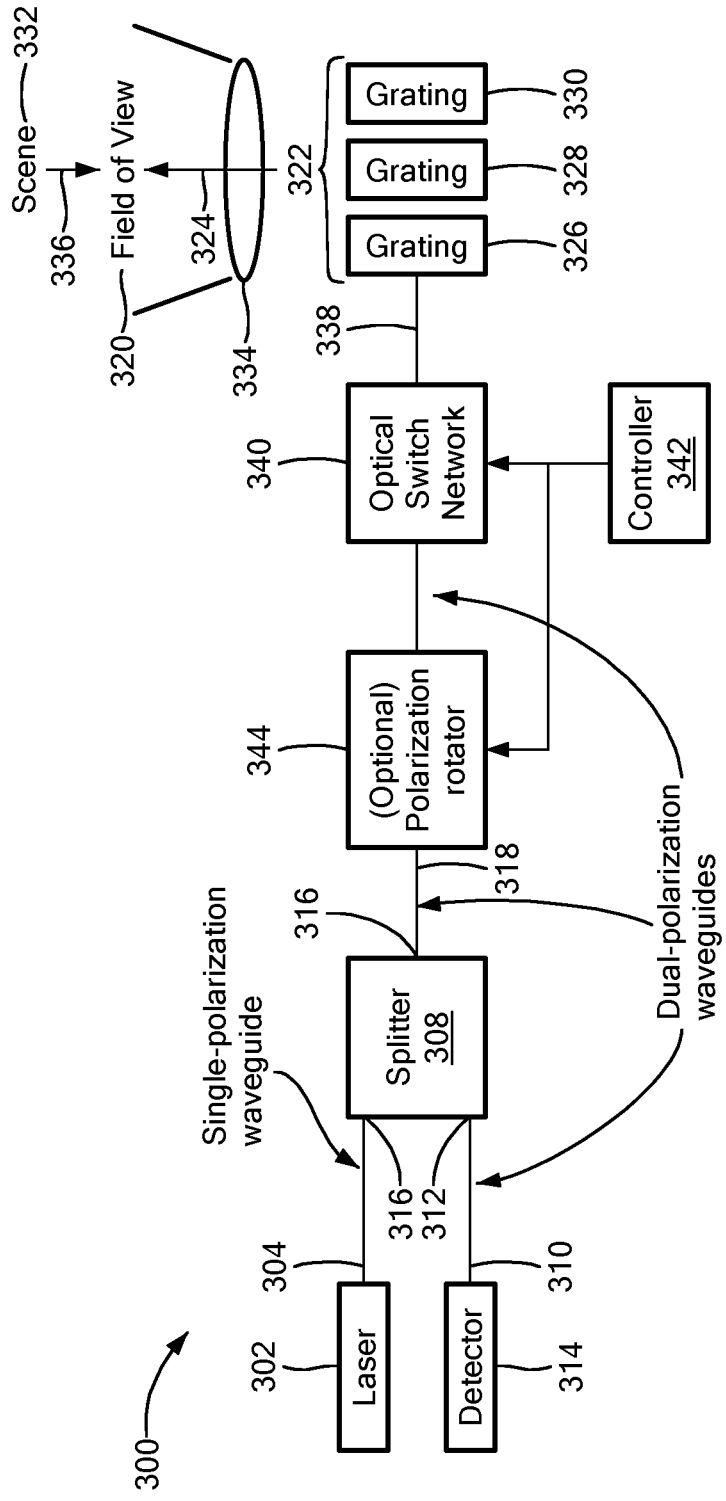
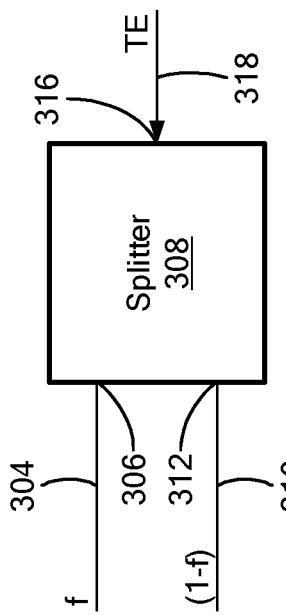
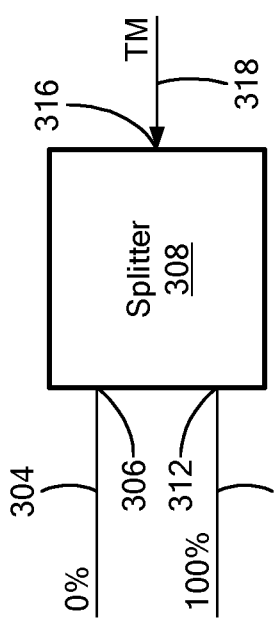
FIG. 3(a)
FIG. 3(b)
FIG. 3(c)

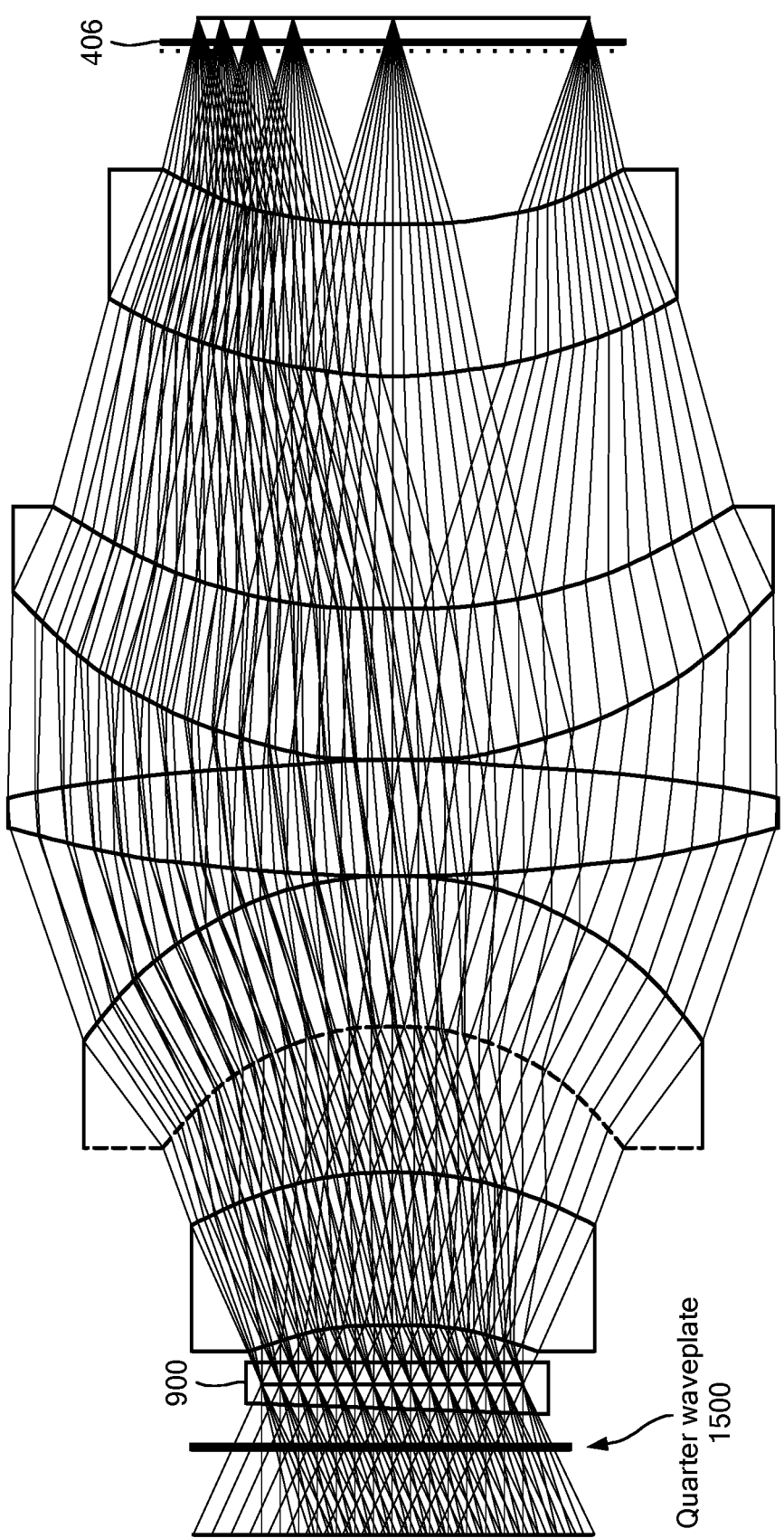

DUAL-POLARIZATION LIDAR SYSTEMS AND METHODS

CROSS REFERENCE TO RELATED APPLICATIONS

This application claims the benefit of U.S. Provisional Patent Application No. 62/757,987, filed Nov. 9, 2018, titled "Dual-Polarization LiDAR Systems and Methods," the entire contents of which are hereby incorporated by reference herein, for all purposes.

BACKGROUND

Technical Field

The present invention relates to light direction and ranging (LiDAR) systems and, more particularly, to LiDAR systems that receive multiple polarizations of reflected light.

Related Art

Light backscattered from objects in a field of view can pose problems for some monostatic light direction and ranging (LiDAR) systems, i.e. LiDAR systems in which the same optics are used to send excitation pulses into a scene and collect return signals. If some of the backscattered light returns with a different polarization than the outgoing pulses, or the backscatter reflectivity of an object in the field of view is higher for one polarization than for the other polarization, the LiDAR optics may not receive the backscattered light efficiently or at all, or the LiDAR optics may not receive all the polarizations equally.

SUMMARY OF EMBODIMENTS

An embodiment of the present invention provides a LiDAR system. The LiDAR system has a field of view. The LiDAR system includes one or more polarization-based waveguide splitters. Each polarization-based waveguide splitter has a first splitter port, a second splitter port and a common splitter port. A laser is optically coupled to the first splitter port via a single-polarization waveguide. The LiDAR system also includes an array of optical emitters and an objective lens. The objective lens optically couples the array of optical emitters to the field of view. Each optical emitter of the array of optical emitters is optically coupled to a respective unique portion of the field of view. An optical switching network is coupled via respective dual-polarization waveguides between the common splitter port and the array of optical emitters. An optical receiver is optically coupled to the second splitter port via a dual-polarization waveguide. The optical receiver is configured to receive light reflected from the field of view. A controller is coupled to the optical switching network. The controller is configured to cause the optical switching network to route light from the laser to a sequence of optical emitters of the array of optical emitters according to a temporal pattern.

Optionally, the LiDAR system includes a polarization rotator optically coupled between the polarization-based waveguide splitter and the optical switching network. The polarization rotator may be configured to control polarization of light emitted by the sequence of optical emitters.

Optionally, in any embodiment, the polarization rotator may be configured to statically control the polarization of the light emitted by the sequence of optical emitters.

Optionally, in any embodiment, the polarization rotator may be configured to dynamically control the polarization of the light emitted by the sequence of optical emitters in response to commands from the controller.

Optionally, in any embodiment, each emitter of the array of optical emitters may include a respective dual-polarization free-space-to-waveguide grating coupler.

Optionally, in any embodiment, each dual-polarization free-space-to-waveguide grating coupler may include a respective TM-optimized grating segment adjacent a respective TE-optimized grating segment.

Optionally, any embodiment may also include a birefringent material optically coupled between the array of optical emitters and the field of view.

Optionally, in any embodiment, each dual-polarization free-space-to-waveguide grating coupler may include a respective plurality of TM-optimized grating segments interlaced with a respective plurality of TE-optimized grating segments.

BRIEF DESCRIPTION OF THE DRAWINGS

The invention will be more fully understood by referring to the following Detailed Description of Specific Embodiments in conjunction with the Drawings, of which:

FIG. 3(a) is a schematic block diagram of a LiDAR system, according to an embodiment of the present invention.

FIGS. 3(b) and 3(c) are schematic block diagrams of a polarization-based splitter of the LiDAR system of FIG. 3(a), respectively illustrating TM-polarized light and TE-polarized light propagating through the splitter, according to an embodiment of the present invention.

FIG. 15 is a side view of the objective lens train with an optional quarter waveplate placed in the optical path, such that the birefringent wedge of FIG. 9 is between the quarter waveplate and a photonic integrated circuit (PIC), so as to convert an outgoing channel to circular polarization, according to an embodiment of the present invention.

DETAILED DESCRIPTION OF SPECIFIC EMBODIMENTS

Figure 1:
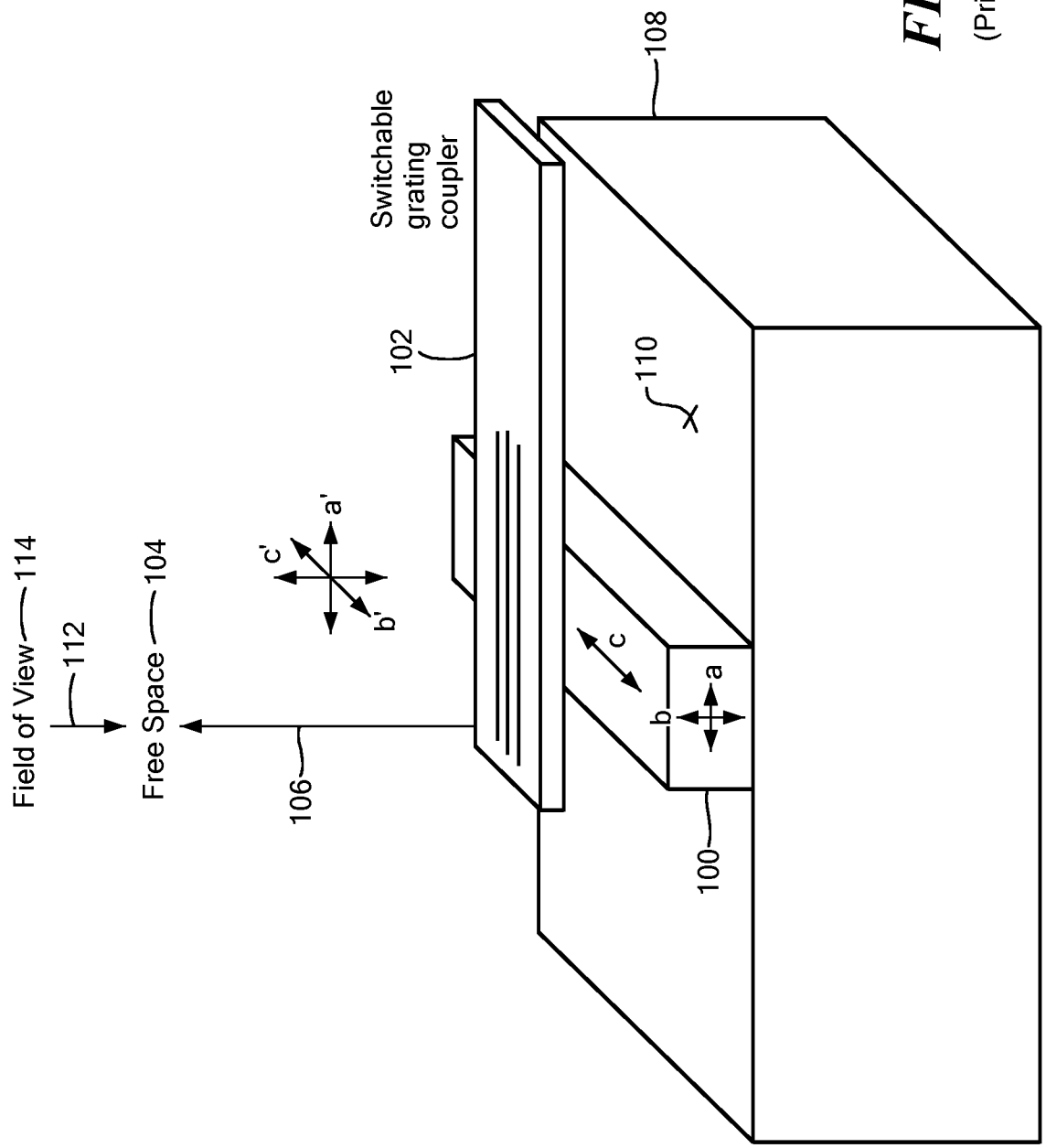
FIG. 1 is a perspective view of an optical switch that includes a moveable micro-electromechanical systems (MEMS) grating coupler that selectively couples light between a waveguide and free space, according to the prior art.

Our previous disclosures, for example U.S. Pat. No. 10,473,862, titled "Integrated MEMS Switches for Selectively Coupling Light in and out of a Waveguide," issued Nov. 12, 2019 (the '862 patent), and U.S. Pat. No. 10,466,423, titled "Partitioned Optical Switch," issued Nov. 5, 2019 (the '423 patent), the entire contents of each of which are hereby incorporated by reference herein, for all purposes, describe monostatic LiDAR systems and methods, wherein moveable (micro-electromechanical systems (MEMS)) grating couplers send light from a waveguide into particular directions, and the same grating coupler collects backscattered light back into the same waveguide, from which it is routed to a photodetector and timing circuit. Referring to FIG. 1, light from a laser (not shown) is typically in a transverse electric (TE) polarized mode of a waveguide 100, propagating along the axis c, with an electric E-field predominantly in direction a, and a magnetic B-field predominantly in direction b.

The most straightforward way to design such a system, implicit in our previous disclosures, is to optimize a grating coupler 102 for this polarization mode, i.e. to maximize the efficiency that the grating coupler 102 turns light in the TE mode into the corresponding free-space 104 polarization, with the E-field along the a' axis and the B-field along the b' axis, propagating 106 in direction c'. FIG. 1 shows c' normal to photonic integrated chip (PIC) 108 surface 110. However, the free-space light 106 could also propagate in other directions or a range of directions. Thanks to the principle of electromagnetic reciprocity, that same grating coupler 102 also efficiently in-couples backscattered light 112 from that same free-space 104 polarization into the original TE mode traveling back towards the source, down in the waveguide 100.

There are two problems with this design. First, and more importantly, some fraction of the backscattered light 112 returns with a different polarization than it started with. For example, if the backscattered light 112 is unpolarized, then half the energy is in each of the two polarizations. Therefore, a grating 102 optimized exclusively for one polarization can only in-couple 50% of the photons, on top of other losses. Second, the backscatter reflectivity of certain objects in the field of view 114 may be higher for one polarization than the other polarization. One example of such an object is a transparent object at a grazing angle to a viewer, such as a back window of a sedan automobile, which tends to backscatter s-polarized light, where "s-polarized" is defined relative to the object's surface orientation, more than p-polarized light, thanks the Brewster effect. Therefore if a LiDAR system can send out light 106 with either polarization or both polarizations, the LiDAR system can detect and measure these types of objects more reliably.

Figure 2:
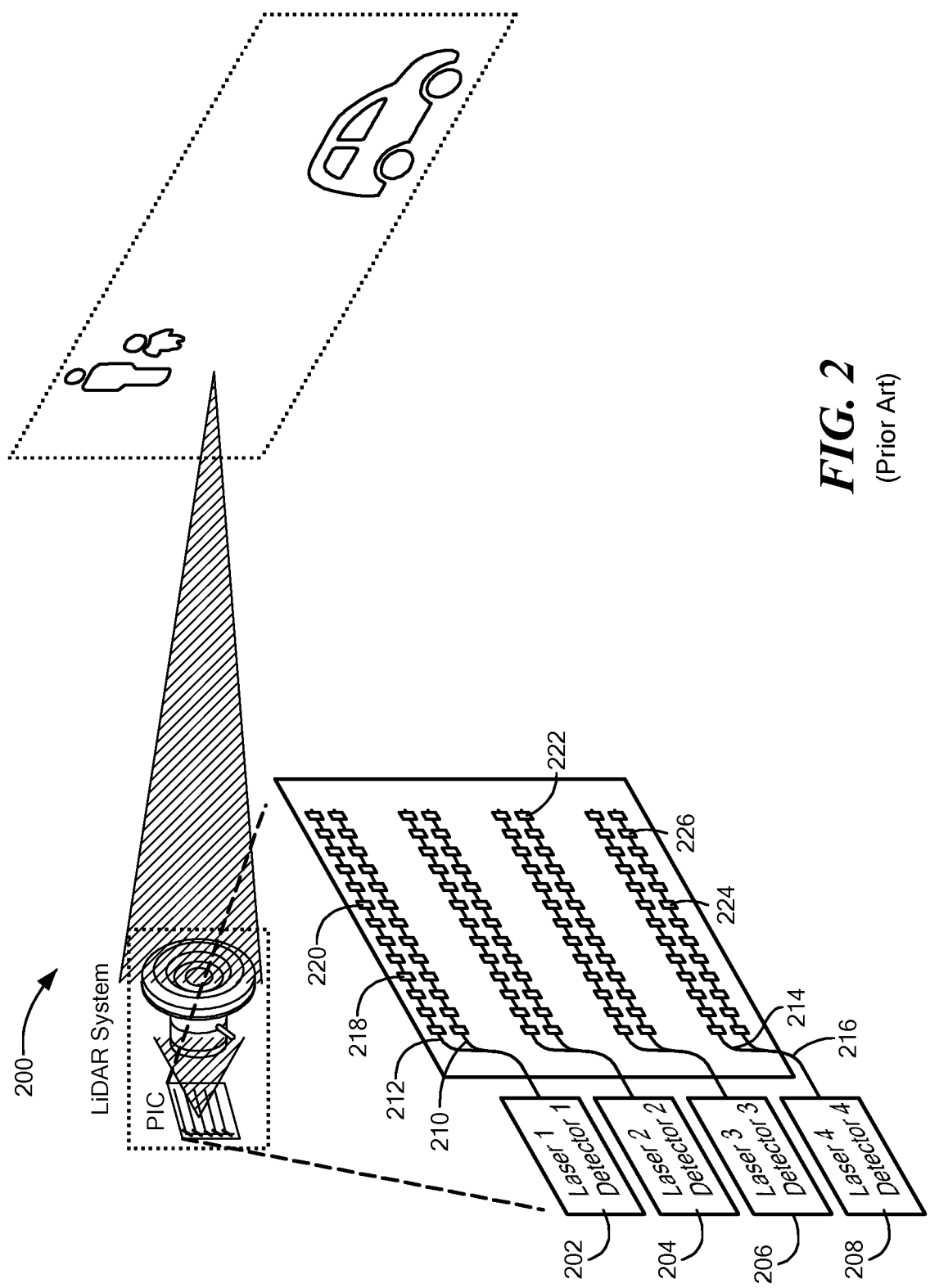
FIG. 2 is an overview diagram of a light direction and ranging (LiDAR) system that includes several of the grating couplers of FIG. 1, according to the prior art.

FIG. 2 provides an overview of a LiDAR system 200, as described in the aforementioned '862 and '423 patents. One or more laser-detector pairs 202, 204, 206 and/or 208 are each connected to one or more waveguides, exemplified by waveguides 210, 212, 214 and 216, each waveguide 210-216 having a respective series of switchable gratings, represented by switchable gratings 218, 220, 222, 224 and 226.

FIG. 3(a) is a block diagram illustrating parts of a LiDAR system 300, according to an embodiment of the present invention. A laser 302 sends light of a fixed (usually TE) polarization into a waveguide 304. This initial waveguide 304 might or might not be capable of also carrying TM-polarized light, but that is not its function. The light then reaches a first port 306 of a polarization-based splitter 308. A separate waveguide 310 optically couples a second port 312 of the polarization-based splitter 308 to a photodetector (receiver) 314. A common port 316 is optically coupled to a waveguide 318 that is optically coupled to a field of view 320 of the LiDAR system 300 via an array of optical emitters 322 such as an array of optical gratings, as described below.

The function of the polarization-based splitter 308 is illustrated in FIGS. 3(b) and 3(c). Laser light propagates through the polarization-based splitter 308, toward the right in FIGS. 3(a-c). The light is radiated 324 by one or more optical gratings, represented by gratings 326, 328 and 330, into free space toward a scene 332 within the field of view 320. Collectively, the gratings 326-330 form the array of optical emitters 322. An objective lens 334 optically couples the array of optical emitters 322 to the field of view 320, such that each optical emitter (grating) 326-330 of the array of optical emitters 322 is optically coupled to a respective unique portion of the field of view 320. Each optical emitter 326-330 may be considered to image a pixel of the field of view 320. Although the objective lens 334 is shown as a single-element lens, the objective lens 334 may be a multi-element lens.

Some light 336 is reflected back from objects in the scene 332 and is then coupled by the array of optical emitters 322 back into a waveguide 338 and propagates toward the left. This light reaches the common port 316 of the polarization-based splitter 308.

For TM-polarized light reaching the common port 316 of the polarization-based splitter 308 in FIG. 3(a), ideally 100% of the light reaches the photodetector 314, as illustrated in FIG. 3(b). For TE-polarized light reaching the common port 316 of the polarization-based splitter 308 in FIG. 3(a), some fraction f goes back towards the laser 302, while the remainder (1−f) ideally goes towards the detector 314, as illustrated in FIG. 3(c). The value off should generally be between about 50% and 100%, where the optimal value depends on an amount of backscattered waveguide-coupled light of each polarization. For example, if the backscattered light 336 completely retains its polarization, the optimal value off is 50% (based on maximizing the product of f×(1−f)), whereas if both polarizations are backscattered 336 and coupled equally into the waveguide 338, the optimal value off is 100% (based on maximizing the sum f×(1−f)+f×100%). Polarization-based waveguide splitters 308 have been discussed and designed in the literature, for example "An integrated-nanophotonics polarization beamsplitter with 2.4×2.4 µm$^2$ footprint," Shen et al., Nature Photonics 9, 378 (2015), the entire contents of which are hereby incorporated by reference herein, for all purposes.

As described in the aforementioned '862 and '423 patents, an optical switching network 340 addresses individual optical emitters (grating couplers) 326-330 or groups of optical emitters. The optical switching network 340 may include MEMS-based optical switches. Each optical switch in the optical switch network 340 may use an electrostatic MEMS structure to selectively position a translatable optical element, such as a portion of an optical waveguide, an optical coupling frustrator or an optical coupling bridge, close to, or far from, a bus optical waveguide. In the close ("ON") position, light couples between the translatable optical element and the bus optical waveguide, whereas in the far ("OFF") position, no appreciable light couples between the translatable optical element and the bus optical waveguide. The bus optical waveguide and connecting optical waveguides may be arranged in an H-tree, cross-bar or other switching configuration. Thus, an optical signal from the laser 302 may be routed via the optical switching network 340 to a selected one or more ports, and thence to a corresponding one or more of the optical emitters 326-330. Similarly, light received from the field of view 320 by the optical emitters 326-330 may be routed via the optical switching network 340 to the detector 314.

A controller 342, such as a suitable microprocessor executing instructions stored in a memory, controls operation of the optical switching network 340. For example, the controller 342 may cause the optical switching network 340 to route light from the laser 302 to a series of the gratings 326-330, so as to sweep a portion of the field of view 320. The sweep may be continuous or discontiguous, i.e., the sweep may jump between non-contiguous pixels.

After the polarization-based splitter 308 is an optional waveguide-integrated polarization rotator 344, which allows the outgoing light to be TE, TM, or any combination thereof, either statically or dynamically. The waveguide-integrated polarization rotator 344 can serve several purposes, including making the LiDAR system 300 more robust against objects that back-reflect different polarizations to different extents, reducing stray light associated with glare or allowing the light to preferentially use a polarization that works better for the rest of the out-coupling process. For example, it is possible to switch the outgoing light 324 from TE to TM, if the waveguides 304, 310, 318 and 338 are less lossy for TM than for TE, or the off-state gratings 326-330 create less undesirable scattering for TM than for TE, or the on-state gratings 326-330 are more efficient for TM than for TE. Examples of waveguide-integrated polarization rotators 344 are described in the literature. A static example is described in "Silicon-Waveguide-Based Mode Evolution Polarization Rotator," Zhang, et al., IEEE Journal of Selected Topics in Quantum Electronics 16, p. 53 (2010). A dynamic example is described in "Highly efficient broadband waveguide based adiabatic polarization converter with apodization," Aashna, et al., 2016 International Conference on Numerical Simulation of Optoelectronic Devices (NUSOD).

Figure 4:
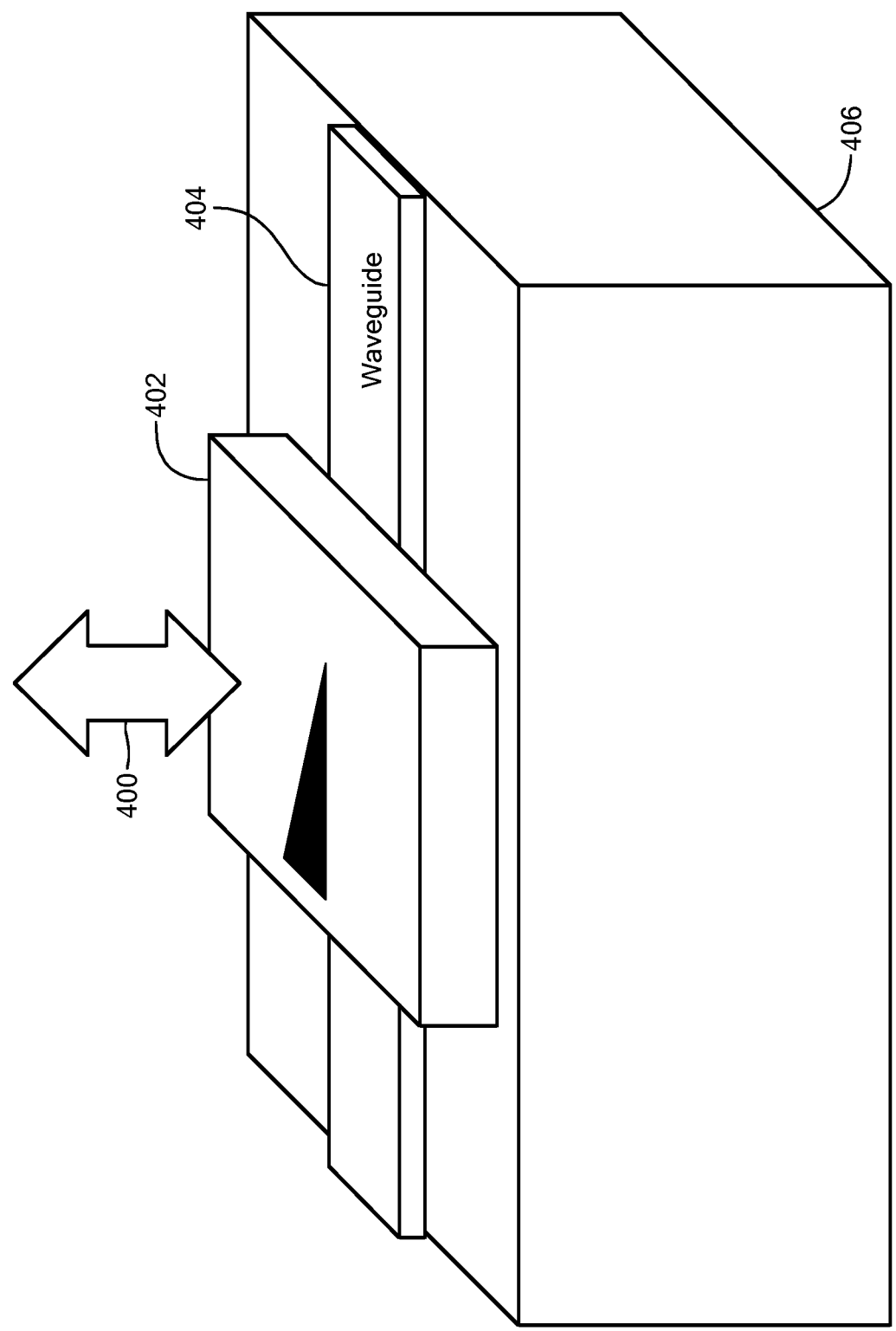
FIG. 4 is a perspective view of a dynamic polarization rotator, according to an embodiment of the present invention.

Dynamic polarization rotation could also be accomplished, for example, by moving (as indicated by double-headed arrow 400) MEMS structures, exemplified by a MEMS structure 402, into proximity with waveguides, exemplified by a waveguide 404, as illustrated schematically in FIG. 4, in which an adiabatic change in the shapes of the two polarization modes is created by the proximate etched MEMS structure 402 interacting with the evanescent field. The waveguide 404 is on or in a PIC 406.

The waveguide 338 passes under the series of switchable dual-polarization free-space-to-waveguide grating couplers 326-330. These couplers 326-330 could be designed using two-dimensional sub-wavelength gratings, as described in "Polarization independent grating coupler for silicon-on-insulator waveguides," Chiu, et al., 2010 International Conference on Optical MEMS and Nanophotonics Incorp, the entire contents of which are hereby incorporated by reference herein, for all purposes. In this cited work, the authors started with two separate designs for optimizing the two polarizations, then superimposed those designs, then performed a final numerical optimization step. This strategy can be more generally stated as a two-step process: first, find a promising starting design or parameterized family of designs, then perform a numerical optimization to further improve the design. The first step can be implemented in any of many ways, including putting a TM-optimized grating segment next to a TE-optimized grating segment, or interlacing TM-optimized and TE-optimized segments. Or, the first step can be omitted entirely, i.e. the starting point for numerical optimization can be chosen randomly or by guessing a promising design style from experience, literature or trial-and-error.

The second step, numerical optimization, can be done by any of many techniques known to practitioners, including genetic algorithms, gradient descent, topological optimization and so on. In this numerical optimization step, the figure-of-merit used to guide the optimization involves not only the out-coupling efficiency of each of the two polarizations, but also the spatial modes of the two polarizations, and how closely those modes overlap, with higher overlap being preferable.

Accounting for spatial mode overlap is important because, if the objective lens is not birefringent, then the return light of both polarizations will be focused into the proximity of the waveguide coupler with the same spatial mode as each other, and with a similar spatial mode as the outgoing light.

For an example of why this spatial mode overlap matters, a simple but poorly-performing method of designing such a grating 326-330 may include a TE-optimized grating section next to a TM-optimized grating section, with substantial spatial separation between the two. It would be unlikely for light 324 exiting out the TE-optimized section to backscatter 336 into the TM-optimized section or vice-versa, because return photons 336 tend to get focused back into the vicinity of where they were originally emitted from, if the LiDAR system is well-focused.

Figure 5:
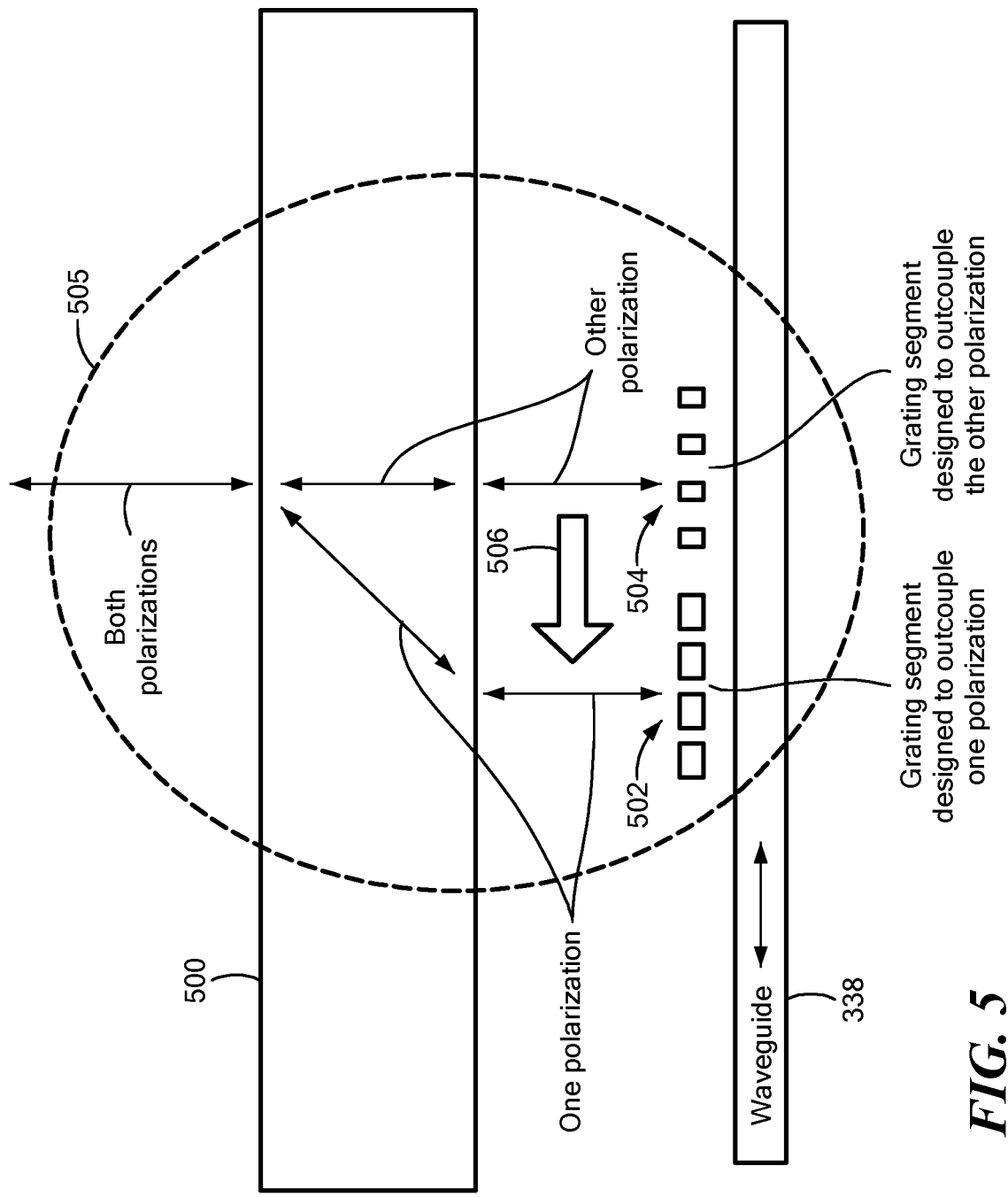
FIG. 5 is a side view of a birefringent element proximate two grating couplers to bring outputs from the two grating couplers into approximately the same spatial mode, and thus mitigate a problem of poor cross-coupling, according to an embodiment of the present invention.

Therefore this latter design approach, i.e. a TE-optimized grating section next to a TM-optimized grating section, is potentially inefficient, because the light from one section is unlikely to get focused back into the other section. However, it is possible to rescue this approach by adding a birefringent element 500 to the optical path, as shown in FIG. 5. Birefringence is an optical property of a material having a refractive index that depends on the polarization and propagation direction of light. These optically anisotropic materials are said to be birefringent (birefractive). A birefringent plate, for example calcite, can function as a birefringent beam displacer, shifting the position of one polarization with respect to the other. Thus, a birefringent plate 500 in proximity to the grating couplers 502 and 504 can bring the outputs from the two grating sections 502 and 504 into approximately the same spatial mode, and thus mitigate the problem of poor cross-coupling described above, thereby creating a dual-polarization free-space-to-waveguide coupler 505. Birefringent elements can be configured in other ways to create the same result. As one example, a birefringent wedge could be placed on the opposite side of the objective lens 334 from the PIC 406, creating a polarization-dependent tilt that is functionally equivalent to a polarization-dependent position shift at the lens's image plane near the PIC.

Figure 6:
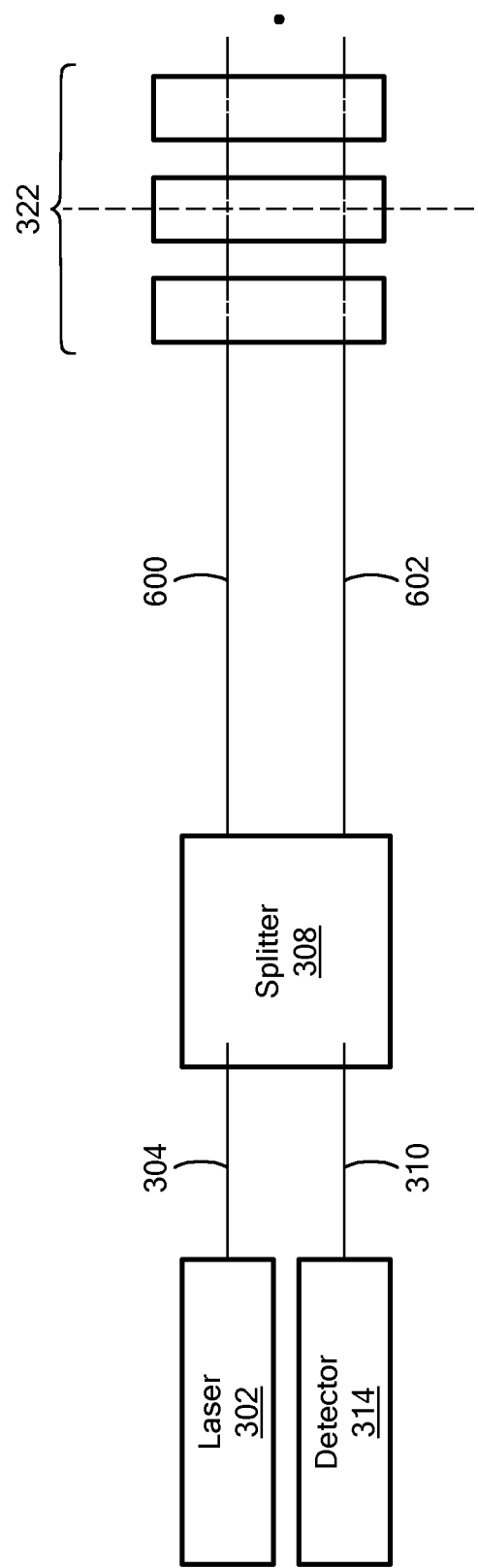
FIG. 6 is a schematic block diagram of an alternative light circuit for the LiDAR system of FIG. 3(a) that includes two side-by-side waveguides, for example where a birefringent plate causes a polarization-dependent position shift in light, according to an embodiment of the present invention.
Figure 7:
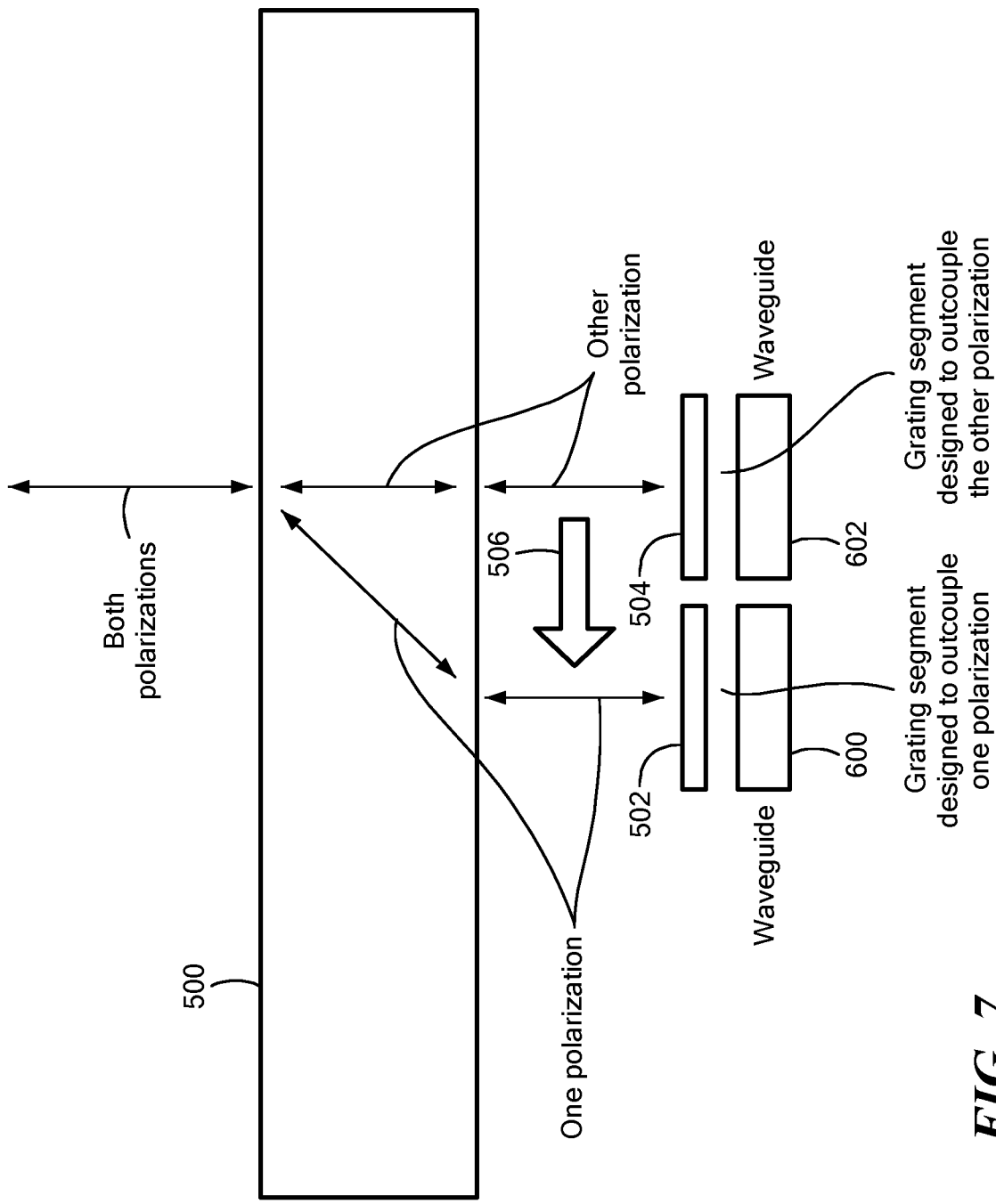
FIG. 7 a side view, similar to that of FIG. 5, showing the two side-by-side waveguides of FIG. 6 and the element combining two outputs, according to an embodiment of the present invention.

The birefringent element 500 in FIG. 5 is shown as creating a polarization-dependent position shift 506 parallel to the direction of the waveguides 338. Another possibility, such as using a polarization-dependent position shift perpendicular to the waveguides 338, can also be advantageously used. In particular, the birefringent plate makes an alternative optical layout viable, as shown in FIG. 6. Here, under the gratings 322, instead of dual-polarization waveguides, there are two side-by-side waveguides 600 and 602, each waveguide 600 and 602 being intended to primarily carry a single polarization of light. The birefringent element 500 combines the outputs as shown in FIG. 7 and as discussed above. The design is, in other respects, analogous to the layout described above, after the appropriate translation of concepts and terminology to describe a pair of waveguides 600 and 602 carrying a single polarization each, rather than a single waveguide 338 carrying both polarizations. For example, the 1-to-2 splitter in FIG. 3 is now a 2-to-2 mixer instead, or when f=0 the splitter can be eliminated.

U.S. Patent Application Publication No. 2019/0162908, published May 30, 2019 and titled "Coupling Lens Aberration Correction through Grating Design in a Switched Focal Plane Array," the entire contents of which are hereby incorporated by reference herein for all purposes, discloses how gratings can be used to change focal settings, such as shifting emission direction or focus. See, for example, paragraph [0045] and FIG. 8C, and paragraph [0051] and FIG. 12.

Related concepts were previously disclosed and discussed in our U.S. Patent Application Publication No. 2019/0271821, published Sep. 5, 2019, and titled "System and Methods for Isolating Excitation and Signal Paths for Chip-Scale LiDAR" (the '821 publication), the entire contents of which are hereby incorporated by reference herein, for all purposes. However, the '821 publication and the new ideas described herein utilize different kinds of structures to achieve the end goal of separating out the send and receive paths. In the '821 publication, we utilize MEMS switch and waveguide architectures, in some cases including waveguides oriented at a 90-deg angle relative to one another, together with birefringent optical elements. The present disclosure explains how polarization rotation elements can be used in conjunction with birefringent optical elements to separate the send and receive paths, while keeping a simpler waveguide architecture, e.g. parallel send and receive waveguides, which are optimized for a single polarization.

Disclosed herein are various configurations of birefringent elements, polarization rotating elements, either a separate microstructured plate or using the gratings, and waveguides to achieve separation of the send and receive paths.

Figure 8:
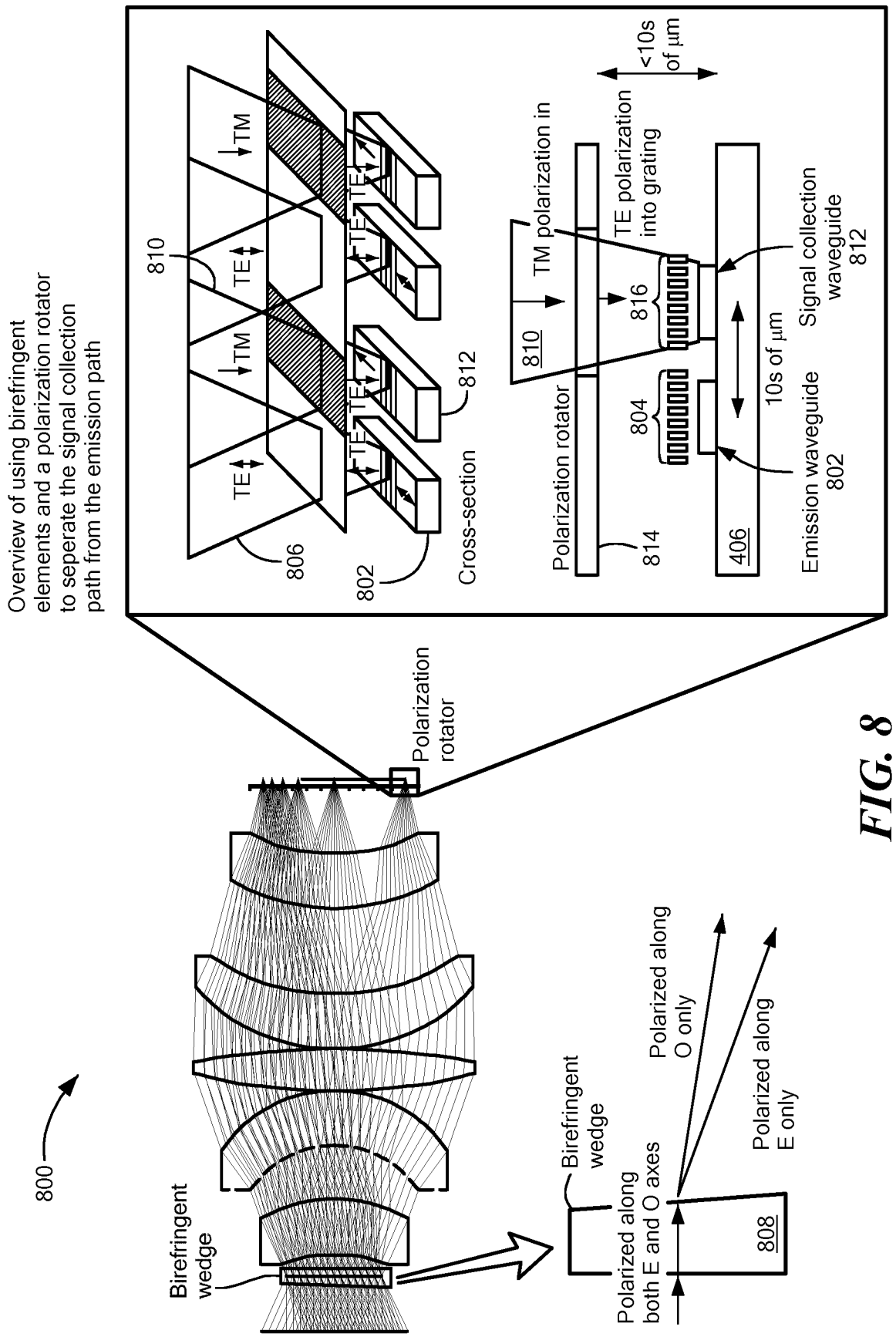
FIG. 8 illustrates components of, TE polarized light emitted by, and TM-polarized light received by, a LiDAR system, according to an embodiment of the present invention.

FIG. 8 illustrates a LiDAR system 800, according to an embodiment of the present invention. The emission waveguide 802 carries a TE polarized guided mode (E-field in the plane of the PIC 406, perpendicular to the waveguide 802 length), and a grating coupler 804 ejects it from the waveguide 802 into a TE-polarized free space beam 806 (E-field perpendicular to the waveguide 802 length). This beam 806 scatters off an object (not shown) in the scene, where typically the polarization will be randomized. A return signal returns to the system. A birefringent element 808 is used to spatially separate two orthogonal polarizations before they reach the PIC 406. The TE-polarized signal returns to the emission grating 804. The TM-polarized signal 810 is directed toward a separate signal collection waveguide 812. A polarization rotator 814 within proximity of the PIC 406 is used to rotate the polarization of the return signal (to TE polarization). The gratings 804 and 816, respectively, over each waveguide 802 and 812 then couple the return signal into the respective waveguide 802 or 812.

One option for the design of a polarization rotator is a microstructured layer on top of an optically clear substrate, for example as described in Khorasaninejad, M., Chen, W. T., Devlin, R. C., Oh, J., Zhu, A. Y., & Capasso, F. (2016), "Metalenses at visible wavelengths: Diffraction-limited focusing and subwavelength resolution imaging," Science, 352 (6290), 1190-1194, https://doi.org/10.1126/science.aaf6644., the entire contents of which are hereby incorporated by reference herein, for all purposes. For example, Khorasaninejad FIG. 1B shows a possible microstructured polarization rotator. The substrate might be glass, and the pillars might be poly-silicon or titanium dioxide, for example. The pillars might have height 500 nm, pitch 500 nm, and duty cycle 50%, for example. An alternative is a birefringent half-waveplate, e.g. a 3-μm thick calcite layer.

Figure 9:
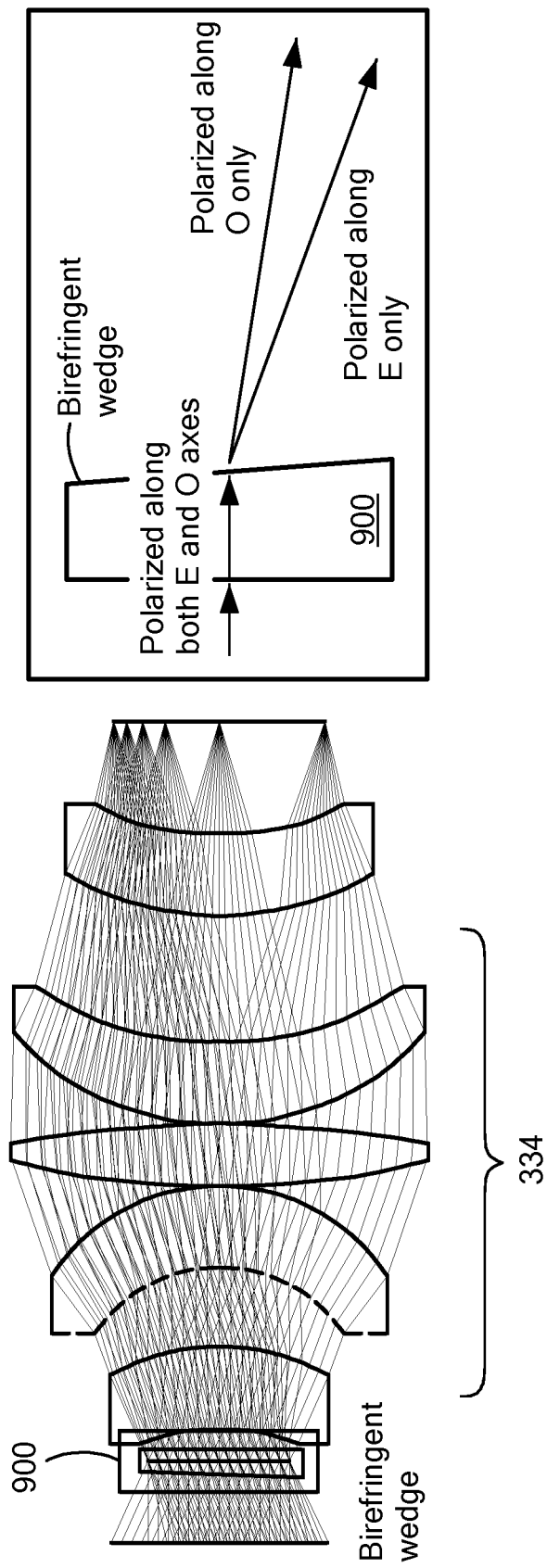
FIGS. 9 and 10 illustrate two options (a birefringent wedge and a birefringent plate) for different polarization-separating components for the LiDAR system of FIG. 8, including possible locations of those elements in an objective lens train, according to respective embodiments of the present invention.
Figure 10:
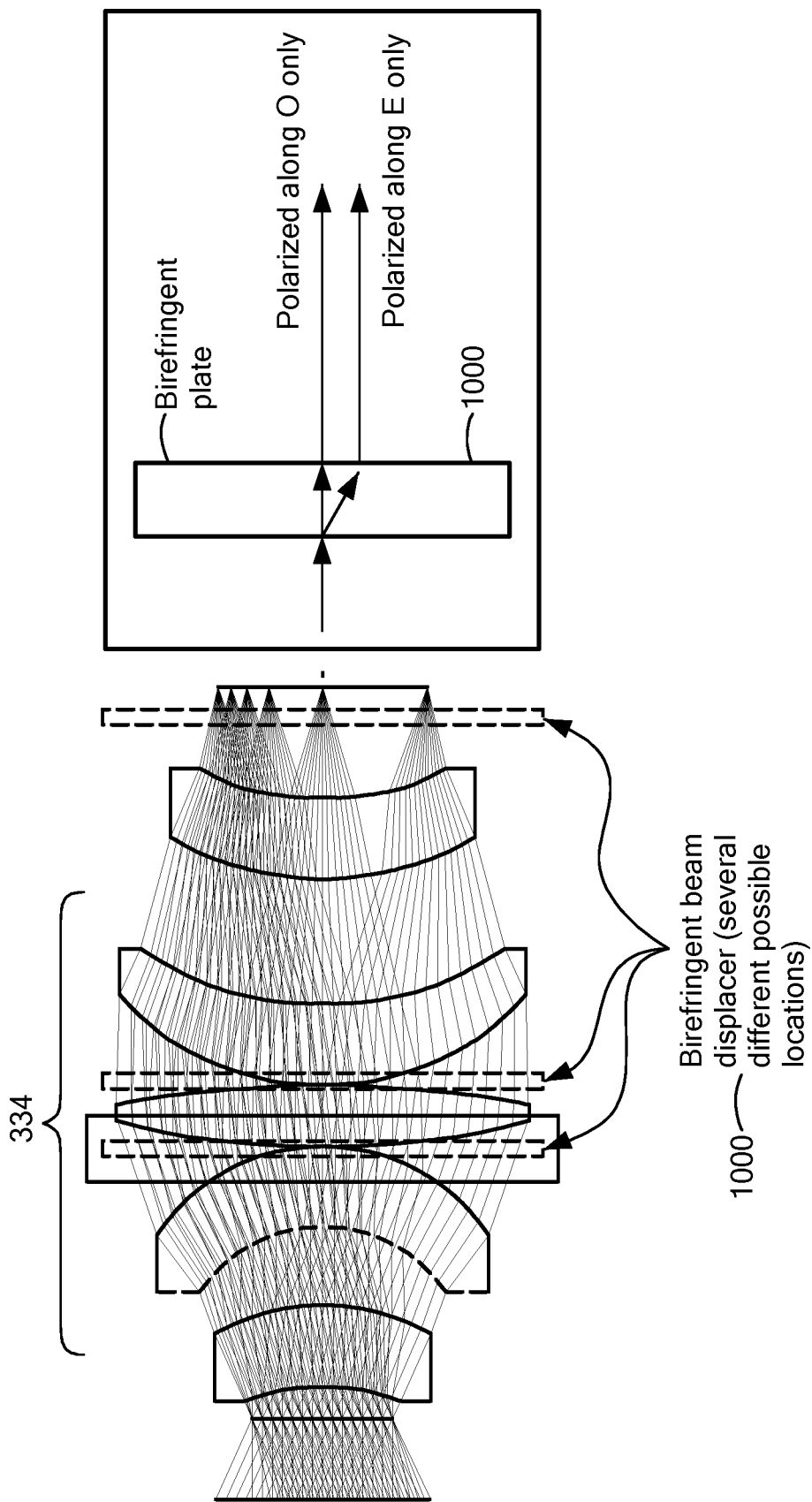

FIGS. 9 and 10 illustrate two options for different polarization-separating components 900 and 1000 that can be used, and give potential locations of those elements in the objective lens 334 train. The first option, shown in FIG. 9, is a birefringent wedge 900, and the second, shown in FIG. 10, is a birefringent beam displacer 1000.

The birefringent wedge 900, shown in FIG. 9, is placed in or near a Fourier plane with respect to the PIC 406, or more generally any plane with the property that changing the angle of a light ray in this plane corresponds to changing the position of that light ray at the PIC 406. The aperture stop in this particular objective lens design is a good location, as the lens is designed to approximately collimate light from the PIC 406. The birefringent wedge 900 deflects light oriented along the ordinary (O) and extraordinary (E) axes by different angles, relative to one another. The objective lens 334 then projects these different polarizations onto different locations on the PIC 406. For example, a birefringent wedge 900 made of quartz, whose faces are 4° apart, creates an angle offset of around 0.05° between the two polarizations.

The birefringent beam displacer 1000, shown in FIG. 10, is placed in or near an image plane, or more generally any plane with the property that changing the position of a light ray in this plane corresponds to changing the position of that light ray at the PIC 406. FIG. 10 shows several potential placement locations for the birefringent beam displacer 1000. A birefringent beam displacer 1000 displaces light polarized along the O and E axes, relative to one another, without imparting an angle on the beam. This displacement occurs even when the incident ray is normal to both of the faces of the birefringent beam displacer 1000.

Figure 11:
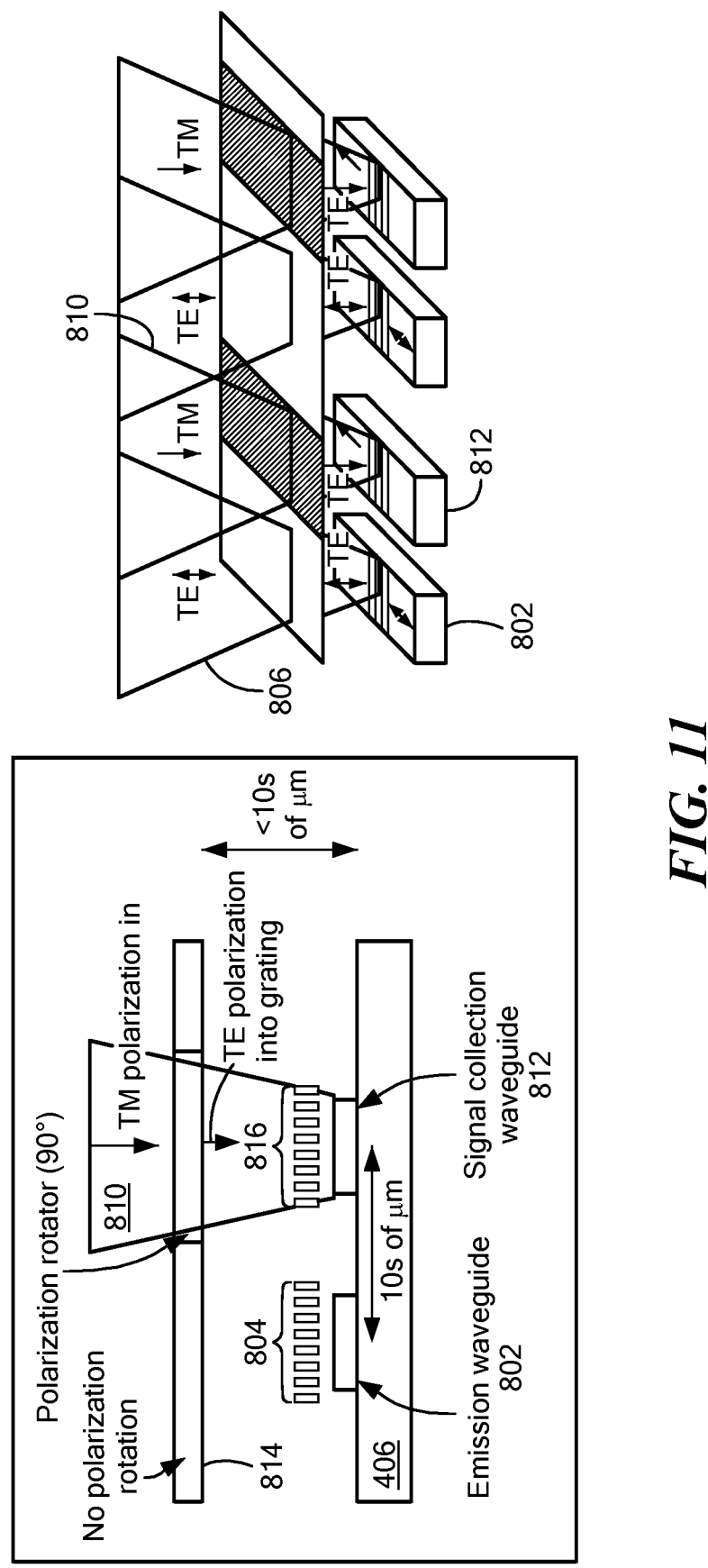
FIGS. 11 and 12 illustrate several configuration options for a polarization rotator of the LiDAR system of FIG. 3(a), according to respective embodiments of the present invention.
Figure 12:
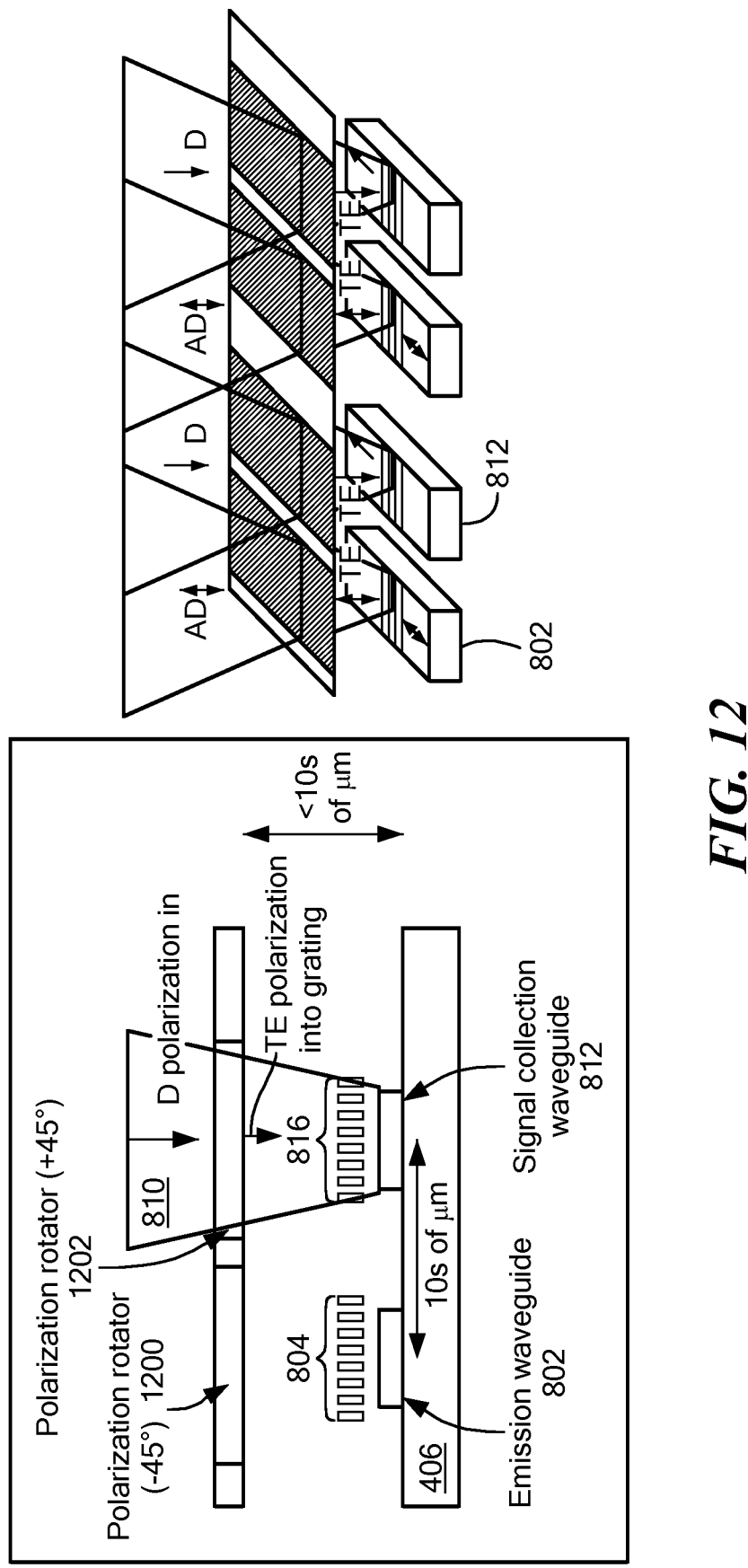

FIGS. 11 and 12 give several configuration options for the polarization rotator 814. The preferred configuration is shown in FIG. 11, where there is no polarization rotator over the emission waveguide 802 and a 90° polarization rotator 814 over the signal collection waveguide 812. All optical elements introduce some optical loss. Placing the polarization rotator 814 over the signal collection element 816 means that stray light will be subjected to the same losses as the return signal 810, while limiting losses to the outgoing laser power from the emission waveguide 802. FIG. 12 shows an alternative configuration, where ±45° polarization rotators 1200 and 1202 are included over both the emission 802 and signal collection 812 waveguides. The polarization in this case is "diagonal" (D) and "anti-diagonal" (AD) for the emitted and collected light, respectively, after this element, relative to the length of the waveguides 802 and 812 on the PIC 406.

Figure 13:
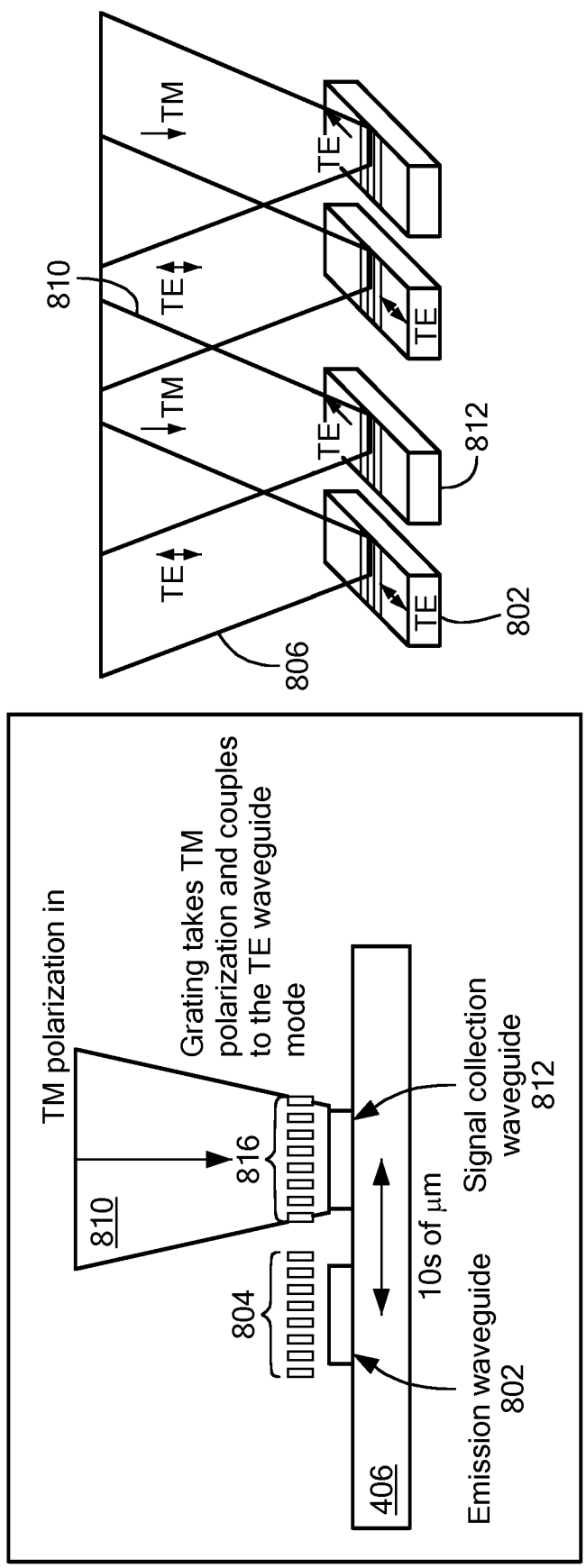
FIGS. 13 and 14 illustrate respective configurations where the grating couplers are configured to impart polarization rotation, instead of a separate optical element, according to respective embodiments of the present invention.
Figure 14:
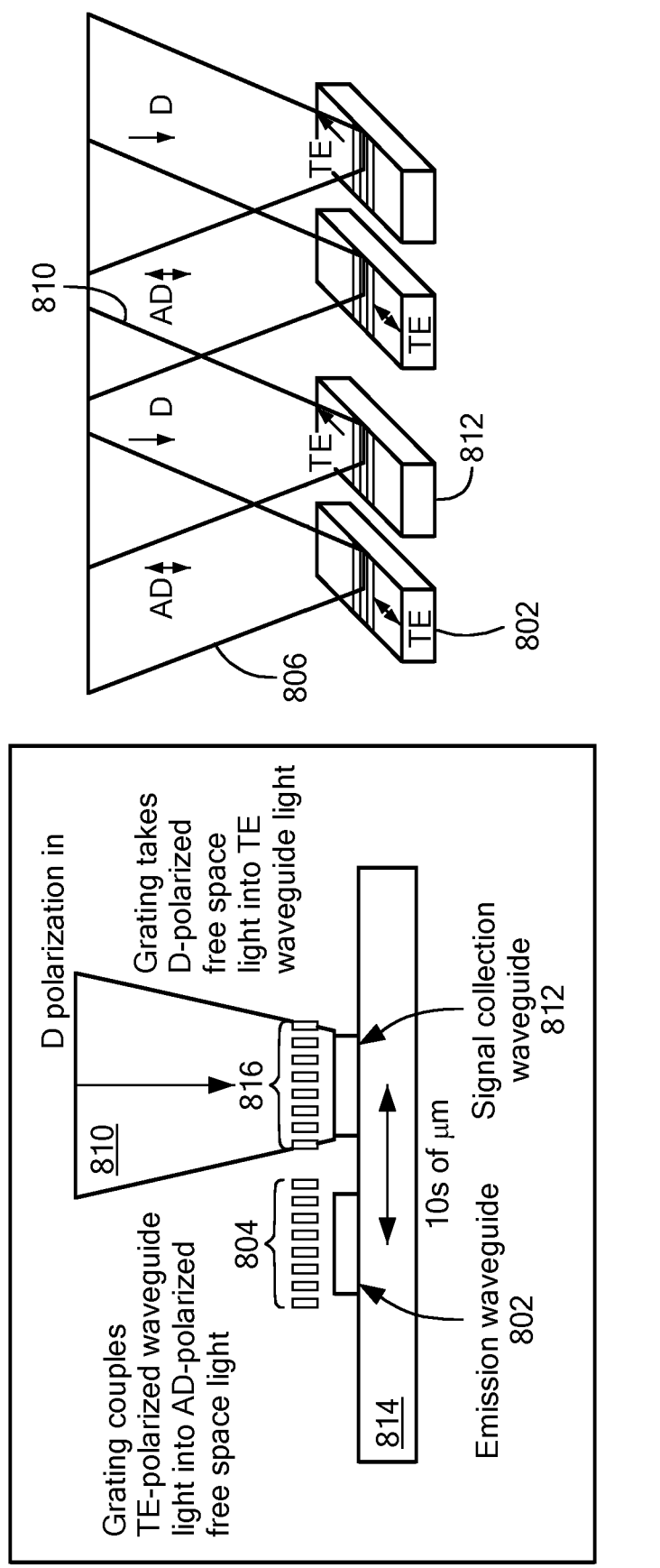

FIGS. 13 and 14 give two configurations where the gratings 804 and 816 are designed to impart the polarization rotation, instead of a separate optical element. Monolithically including the polarization rotation in the design can simplify assembly of the full system, because a separate polarization rotator does not need to be aligned to the PIC 406. Again, several configurations of gratings can be used. FIG. 13 shows a case with no polarization rotation on the emission and a 90° rotation on the return signal 810. FIG. 14 shows a case with a 45° rotation on both the outgoing laser light and incoming return signal.

Additionally, as shown in FIG. 15, a quarter waveplate 1500 could be placed in the optical path, such that the birefringent wedge 900 is between the quarter waveplate 1500 and the PIC 406. The quarter waveplate 1500 is aligned so as to convert the outgoing channel to circular polarization. This mitigates a potential problem that a system without such a waveplate detects only one polarization, and therefore that parts of a scene that reflect much more strongly into the non-detected polarization channel will appear dim. Examples of such situations include glass surfaces at glancing angle, and certain retroreflective elements that preserve linear polarization. If, however, the outgoing channel is, for example, right circular polarized (RCP), and the incoming detected channel is left circular polarized (LCP), then this situation, i.e., where most reflected light is in the non-detected polarization channel, occurs much less frequently. For example, a three-mirror retroreflector converts RCP to LCP, and therefore even more than half the reflected light would be detected. As another example, if a glancing-angle piece of glass back-scatters one linear polarization much more than the other, then it back-scatters equally into the detected and non-detected polarization channels, whereas without the quarter waveplate 1500, the same piece of glass would, at least in some cases, preferentially scatter into the non-detected polarization channel.

In all cases described, the polarization of light in the waveguides 802 and 812 is assumed to be TE, i.e., E-field in the plane of the PIC 406 and perpendicular to the length of the waveguides 802 and 812. Alternatively, the waveguides 802 and 812 can be designed to guide TM-polarized light, i.e., E-field perpendicular to the plane of the PIC 406. These concepts can be used for this configuration as well. If the emission waveguide 802 can carry one polarization, and the receive waveguide 812 can carry the opposite polarization, then there is no need for a polarization rotator.

As used herein, "light" means electromagnetic radiation having a wavelength between about 100 nm and about 1 mm.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders.

All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

A controller that causes operation of MEMS or other optical switches within a LiDAR to direct light to and from selected portions of the LiDAR's field of view, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A LiDAR system having a field of view, the LiDAR system comprising:
   a polarization-based waveguide splitter having a first splitter port, a second splitter port and a common splitter port;
   a laser optically coupled to the first splitter port via a waveguide;
   an array of optical emitters;
   an objective lens optically coupling the array of optical emitters to the field of view, such that each optical emitter of the array of optical emitters is optically coupled to a respective unique portion of the field of view;

an optical switching network coupled via respective waveguides between the common splitter port and the array of optical emitters, wherein:

each emitter of the array of optical emitters comprises a respective dual-polarization free-space-to-waveguide grating coupler;

each dual-polarization free-space-to-waveguide grating coupler comprises a respective first grating segment and a respective adjacent second grating segment spatially separated from the first grating segment;

the first grating segment is configured to emit light provided by the laser from the waveguide into the respective unique portion of the field of view and to couple light of a first polarization received from the respective unique portion of the field of view into the waveguide;

the second grating segment is configured to couple light of a second polarization received from the respective unique portion of the field of view into the waveguide; and the second polarization is different from the first polarization;

a birefringent material disposed in the optical path between the field of view and the array of optical emitters and configured to shift the received light of the second polarization, with respect to the light of the received light of the first polarization, such that light of the first and second polarizations received from the unique portion of the field of view along a common path is split, such that the light of the first polarization impinges on the first grating segment and the light of the second polarization impinges on the second grating segment of the dual-polarization free-space-to-waveguide grating coupler;

an optical receiver optically coupled to the second splitter port via a waveguide and configured to receive light reflected from the field of view; and a controller coupled to the optical switching network and configured to cause the optical switching network to route light from the laser to a sequence of optical emitters of the array of optical emitters according to a temporal pattern.

2. A LiDAR system according to claim 1, further comprising a polarization rotator optically coupled between the polarization-based waveguide splitter and the optical switching network and configured to control polarization of light emitted by the sequence of optical emitters.

3. A LiDAR system according to claim 2, wherein the polarization rotator is configured to statically control the polarization of the light emitted by the sequence of optical emitters.

4. A LiDAR system according to claim 2, wherein the polarization rotator is configured to dynamically control the polarization of the light emitted by the sequence of optical emitters in response to commands from the controller.

5. A LiDAR system according to claim 1, wherein, for each dual-polarization free-space-to-waveguide grating coupler, one of the first and second grating segments comprises a TM optimized grating segment, and the other of the first and second grating segments comprises a TE-optimized grating segment.

6. A LiDAR system according to claim 5, wherein the birefringent material comprises a bircfringcmcnt birefringent wedge.

7. A LiDAR system according to claim 1, wherein each dual-polarization free-space-to-waveguide grating coupler comprises a respective plurality of TM-optimized grating segments interlaced with a respective plurality of TE-optimized grating segments.

8. A LiDAR system according to claim 1, wherein the birefringent material comprises a birefringent beam displacer.

9. A LiDAR system according to claim 1, further comprising a 90° polarization rotator disposed over the second grating segment and configured to rotate the polarization of the light of the second polarization received from the respective unique portion of the field of view prior to coupling it into the corresponding waveguide.

10. A LiDAR system according to claim 1, wherein the second grating segment is configured to impart a 90° polarization rotation to the light of the second polarization received from the respective unique portion of the field of view.

11. A LiDAR system according to claim 1, wherein:
(a) either:
  (1) the system further comprises a −45° polarization rotator disposed over the first grating segment and configured to rotate the polarization of the light of the first polarization received from the respective unique portion of the field of view prior to coupling it into the corresponding waveguide; or
  (2) the first grating segment is configured to impart a −45° polarization rotation to the light of the first polarization received from the respective unique portion of the field of view; and
(b) either:
  (1) the system further comprises a +45° polarization rotator disposed over the second grating segment and configured to rotate the polarization of the light of the second polarization received from the respective unique portion of the field of view prior to coupling it into the corresponding waveguide; or
  (2) the second grating segment is configured to impart a +45° polarization rotation to the light of the second polarization received from the respective unique portion of the field of view.

12. A LiDAR system according to claim 1, further comprising a quarter waveplate disposed between the field of view and the birefringent material and configured to convert the light emitted from the waveguide to circular polarization.

13. A LiDAR system having a field of view, the LiDAR system comprising:
a mixer or splitter, the mixer or splitter having a first port, a second port, a third port, and a fourth port;
a laser optically coupled to the first port via a waveguide;
an array of optical emitters;
an objective lens optically coupling the array of optical emitters to the field of view, such that each optical emitter of the array of optical emitters is optically coupled to a respective unique portion of the field of view;
an optical switching network coupled via first and second waveguides between (a) third and fourth ports of the splitter or mixer and (b) the array of optical emitters; wherein:
  each emitter of the array of optical emitters comprises a respective dual-polarization free-space-to-waveguide grating coupler;
  each dual-polarization free-space-to-waveguide grating coupler comprises a respective first grating segment and a respective adjacent second grating segment spatially separated from the first grating segment;

the first grating segment is configured to emit light provided by the laser from the first waveguide into the respective unique portion of the field of view and to couple light of a first polarization received from the respective unique portion of the field of view into the first waveguide;

the second grating segment is configured to couple light of a second polarization received from the respective unique portion of the field of view into the second waveguide; and the second polarization is different from the first polarization;

a birefringent material disposed in the optical path between the field of view and the array of optical emitters and configured to shift the received light of the second polarization, with respect to the light of the received light of the first polarization, such that light of the first and second polarizations received from the unique portion of the field of view along a common path is split, such that the light of the first polarization impinges on the first grating segment and the light of the second polarization impinges on the second grating segment of the dual-polarization free-space-to-waveguide grating coupler;

an optical receiver optically coupled to the second splitter port via a waveguide and configured to receive light reflected from the field of view; and a controller coupled to the optical switching network and configured to cause the optical switching network to route light from the laser to a sequence of optical emitters of the array of optical emitters according to a temporal pattern.

14. A LiDAR system according to claim 13, further comprising a polarization rotator optically coupled between (a) the mixer or splitter and (b) the optical switching network and configured to control polarization of light emitted by the sequence of optical emitters.

15. A LiDAR system according to claim 14, wherein the polarization rotator is configured to statically control the polarization of the light emitted by the sequence of optical emitters.

16. A LiDAR system according to claim 14, wherein the polarization rotator is configured to dynamically control the polarization of the light emitted by the sequence of optical emitters in response to commands from the controller.

17. A LiDAR system according to claim 13, wherein, for each dual-polarization free-space-to-waveguide grating coupler, one of the first and second grating segments comprises a TM-optimized grating segment, and the other of the first and second grating segments comprises a TE-optimized grating segment.

18. A LiDAR system according to claim 13, wherein the birefringent material comprises a birefringent wedge.

19. A LiDAR system according to claim 13, wherein each dual-polarization free-space-to-waveguide grating coupler comprises a respective plurality of TM-optimized grating segments interlaced with a respective plurality of TE-optimized grating segments.

20. A LiDAR system according to claim 13, wherein the birefringent material comprises a birefringent beam displacer.

21. A LiDAR system according to claim 13, further comprising a 90° polarization rotator disposed over the second grating segment and configured to rotate the polarization of the light of the second polarization received from the respective unique portion of the field of view prior to coupling it into the corresponding waveguide.

22. A LiDAR system according to claim 13, wherein the second grating segment is configured to impart a 90° polarization rotation to the light of the second polarization received from the respective unique portion of the field of view.

23. A LiDAR system according to claim 13, wherein:
(a) either:
 (1) the system further comprises a −45° polarization rotator disposed over the first grating segment and configured to rotate the polarization of the light of the first polarization received from the respective unique portion of the field of view prior to coupling it into the corresponding waveguide; or
 (2) the first grating segment is configured to impart a −45° polarization rotation to the light of the first polarization received from the respective unique portion of the field of view; and
(b) either:
 (1) the system further comprises a +45° polarization rotator disposed over the second grating segment and configured to rotate the polarization of the light of the second polarization received from the respective unique portion of the field of view prior to coupling it into the corresponding waveguide; or
 (2) the second grating segment is configured to impart a +45° polarization rotation to the light of the second polarization received from the respective unique portion of the field of view.

24. A LiDAR system according to claim 13, further comprising a quarter waveplate disposed between the field of view and the birefringent material and configured to convert the light emitted from the waveguide to circular polarization.

* * * * *

UNITED STATES PATENT AND TRADEMARK OFFICE
CERTIFICATE OF CORRECTION

PATENT NO. : 11,579,253 B2
APPLICATION NO. : 16/679053
DATED : February 14, 2023
INVENTOR(S) : Steven J. Byrnes, Steven J. Spector and Michael G. Moebius It is certified that error appears in the above-identified patent and that said Letters Patent is hereby corrected as shown below:

In the Claims

In Column 11, Lines 63-65, replace claim "6. A LiDAR system according to claim 5, wherein the birefringent material comprises a bircfringcmcnt birefringent wedge." with the following claim:
"6. A LiDAR system according to claim 1, wherein the birefringent material comprises a birefringent wedge."

Signed and Sealed this
Twenty-first Day of March, 2023

*Katherine Kelly Vidal*
Katherine Kelly Vidal
*Director of the United States Patent and Trademark Office*